US008549684B2

(12) United States Patent
Jusiak

(10) Patent No.: US 8,549,684 B2

(45) Date of Patent: Oct. 8, 2013

(54) GELASTIC MATERIAL HAVING VARIABLE OR SAME HARDNESS AND BALANCED, INDEPENDENT BUCKLING IN A MATTRESS SYSTEM

(75) Inventor: Joel T. Jusiak, Holland, NY (US)

(73) Assignee: Stryker Corporation, Kalamazoo, MI (US)

( * ) Notice: Subject to any disclaimer, the term of this patent is extended or adjusted under 35 U.S.C. 154(b) by 508 days.

(21) Appl. No.: 12/410,954

(22) Filed: Mar. 25, 2009

(65) Prior Publication Data

US 2009/0246449 A1 Oct. 1, 2009

Related U.S. Application Data

(60) Provisional application No. 61/039,259, filed on Mar. 25, 2008.

(51) Int. Cl.

*A47C 27/00* (2006.01)
*B32B 3/24* (2006.01)
*B32B 3/30* (2006.01)

(52) U.S. Cl.

USPC .............. 5/652; 5/630; 5/655.5; 5/901; 5/948; 428/119; 428/120; 428/131; 428/156

(58) Field of Classification Search

USPC ........................................................ 5/953, 740
See application file for complete search history.

(56) References Cited

U.S. PATENT DOCUMENTS 2,588,823 A * 3/1952 Glassman ..................... 428/134
2,617,751 A 11/1952 Bickett
2,887,425 A 5/1959 Holland
3,043,731 A 7/1962 Hill
3,968,530 A 7/1976 Dyson
3,998,215 A 12/1976 Anderson et al.
4,072,635 A 2/1978 Jeram
4,180,923 A * 1/1980 Dassler ......................... 36/32 R
4,194,255 A 3/1980 Poppe
4,456,642 A 6/1984 Burgdörfer et al.
D281,752 S * 12/1985 Dickens et al. ................ D6/582

(Continued)

FOREIGN PATENT DOCUMENTS

DE 4425306 2/1996
EP 1014833 7/2000

(Continued)

OTHER PUBLICATIONS

Machine Translation of JP 08269208 A, Oct. 1996.*

*Primary Examiner* — David Sample
*Assistant Examiner* — Jeff Vonch
(74) *Attorney, Agent, or Firm* — Warner Norcross & Judd LLP

(57) ABSTRACT

A cushioning element has a first gelastic cushion element made from a flexible, resilient, gel cushioning media having shape memory. The first gelastic cushion element has a first hub section, and a first spoke and a second spoke. Each spoke has a proximal end that extends from the first hub section. Each distal end and the spoke area between the distal end and the proximal end does not interconnect to the other spoke, and/or a second gelastic cushion element having a second hub section and corresponding spokes. Each distal end is positioned near and/or contacts the second gelastic cushion element. At least one of the first hub section, the first spoke and the second spoke is capable of buckling beneath a protuberance that is located on the object.

17 Claims, 1 Drawing Sheet

(56) References Cited

U.S. PATENT DOCUMENTS

| | | | | |
|---|---|---|---|---|
| 4,707,872 | A | 11/1987 | Hessel | |
| 4,788,730 | A | 12/1988 | Bexton | |
| 4,897,937 | A * | 2/1990 | Misevich et al. | 36/43 |
| 4,930,171 | A | 6/1990 | Frantz | |
| 5,038,425 | A | 8/1991 | Merry | |
| 5,098,421 | A | 3/1992 | Zook | |
| 5,201,780 | A | 4/1993 | Dinsmoor, III et al. | |
| 5,255,404 | A | 10/1993 | Dinsmoor, III et al. | |
| 5,398,354 | A | 3/1995 | Balonick et al. | |
| 5,456,966 | A * | 10/1995 | Austin | 428/120 |
| 5,513,400 | A | 5/1996 | Turner | |
| 5,590,430 | A | 1/1997 | Sereboff | |
| 5,592,706 | A | 1/1997 | Pearce | |
| 5,593,769 | A | 1/1997 | Wolf et al. | |
| 5,617,595 | A | 4/1997 | Landi et al. | |
| 5,636,395 | A | 6/1997 | Serda | |
| 5,678,266 | A | 10/1997 | Petringa et al. | |
| 5,679,439 | A * | 10/1997 | Schmidt et al. | 428/178 |
| 5,701,621 | A | 12/1997 | Landi et al. | |
| 5,749,111 | A * | 5/1998 | Pearce | 5/652 |
| 5,829,081 | A | 11/1998 | Pearce | |
| 5,836,025 | A | 11/1998 | Poncy, Sr. | |
| 5,850,646 | A | 12/1998 | Turner | |
| 5,865,180 | A | 2/1999 | Sigfrid | |
| 5,881,409 | A | 3/1999 | Pearce | |
| 5,916,664 | A | 6/1999 | Rudy | |
| 5,918,334 | A | 7/1999 | Laidlaw | |
| 5,966,763 | A | 10/1999 | Thomas et al. | |
| 6,026,527 | A | 2/2000 | Pearce | |
| 6,036,271 | A | 3/2000 | Wilkinson et al. | |
| 6,048,327 | A | 4/2000 | Kieffer | |
| 6,052,850 | A | 4/2000 | Salido et al. | |
| 6,080,462 | A | 6/2000 | Gordan | |
| 6,237,598 | B1 | 5/2001 | Sereboff | |
| 6,345,455 | B1 * | 2/2002 | Greer et al. | 36/155 |
| 6,393,640 | B1 | 5/2002 | Dalis | |
| 6,415,583 | B1 | 7/2002 | Landi et al. | |
| 6,416,534 | B1 | 7/2002 | Montagnino et al. | |
| 6,458,380 | B1 | 10/2002 | Leaderman | |
| 6,472,581 | B1 | 10/2002 | Muramatsu et al. | |
| 6,547,327 | B1 | 4/2003 | Yates | |
| 6,548,728 | B1 | 4/2003 | Faries, Jr. et al. | |
| 6,623,517 | B1 | 9/2003 | DeLuisa et al. | |
| 6,625,830 | B2 | 9/2003 | Lampel | |
| 6,677,026 | B1 | 1/2004 | Yates | |
| 6,691,355 | B1 | 2/2004 | Liu | |
| 6,699,266 | B2 | 3/2004 | Lachenbruch et al. | |
| 6,739,008 | B1 | 5/2004 | Kindrick | |
| 6,767,621 | B2 | 7/2004 | Flick et al. | |
| 6,789,284 | B2 | 9/2004 | Kemp | |
| 6,809,143 | B2 | 10/2004 | Nowak et al. | |
| 6,830,793 | B2 | 12/2004 | Hawkins et al. | |
| 6,842,926 | B2 * | 1/2005 | Kuo | 5/655.5 |
| 6,848,134 | B1 | 2/2005 | Schenck | |
| 6,857,932 | B2 | 2/2005 | Chen | |
| 6,865,759 | B2 * | 3/2005 | Pearce | 5/655.5 |
| 6,871,365 | B2 | 3/2005 | Flick et al. | |
| 6,898,814 | B2 | 5/2005 | Kawamura et al. | |
| 6,901,617 | B2 | 6/2005 | Sprouse, II et al. | |
| 6,990,701 | B1 | 1/2006 | Litvak | |
| 7,076,822 | B2 | 7/2006 | Pearce | |
| 7,112,183 | B2 | 9/2006 | Binder et al. | |
| 7,138,079 | B2 | 11/2006 | Pearce | |
| 7,159,259 | B2 | 1/2007 | Chen | |
| 7,399,517 | B2 | 7/2008 | Wang | |
| 7,401,369 | B2 | 7/2008 | White et al. | |
| 7,461,726 | B2 | 12/2008 | Hawkins et al. | |
| 7,536,739 | B2 | 5/2009 | Poulos | |
| 7,571,504 | B2 | 8/2009 | Kuo | |
| 7,587,776 | B2 | 9/2009 | Poulos | |
| 7,624,462 | B2 | 12/2009 | Cao et al. | |
| 7,666,341 | B2 | 2/2010 | Pearce | |
| 7,823,233 | B2 | 11/2010 | Flick et al. | |
| 7,823,234 | B2 | 11/2010 | Flick et al. | |
| 7,827,636 | B2 | 11/2010 | Flick et al. | |
| 8,424,137 | B1 * | 4/2013 | Pearce et al. | 5/630 |
| 8,434,748 | B1 * | 5/2013 | Pearce et al. | 267/142 |
| 2002/0013407 | A1 * | 1/2002 | Pearce | 525/32.1 |
| 2003/0037377 | A1 | 2/2003 | Kawamura et al. | |
| 2003/0121180 | A1 * | 7/2003 | Poe | 36/43 |
| 2003/0187378 | A1 | 10/2003 | Gaylord et al. | |
| 2004/0186405 | A1 | 9/2004 | Pinna et al. | |
| 2004/0226099 | A1 | 11/2004 | Pearce | |
| 2004/0229986 | A1 | 11/2004 | Pearce | |
| 2005/0017396 | A1 | 1/2005 | Pearce et al. | |
| 2005/0187598 | A1 | 8/2005 | Shimizu et al. | |
| 2005/0223493 | A1 | 10/2005 | Setokawa et al. | |
| 2006/0029675 | A1 | 2/2006 | Ginther | |
| 2006/0031994 | A1 | 2/2006 | Willat et al. | |
| 2006/0253988 | A1 | 11/2006 | Pearce | |
| 2007/0220779 | A1 * | 9/2007 | Zona | 36/43 |
| 2007/0226911 | A1 | 10/2007 | Gladney et al. | |
| 2009/0126107 | A1 * | 5/2009 | Kuo | 5/400 |
| 2010/0000020 | A1 | 1/2010 | Poulos | |
| 2010/0005594 | A1 | 1/2010 | Rancourt et al. | |
| 2010/0183847 | A1 | 7/2010 | Pearce et al. | |
| 2010/0223730 | A1 | 9/2010 | Pearce et al. | |
| 2010/0227091 | A1 | 9/2010 | Pearce | |
| 2010/0237082 | A1 | 9/2010 | Fernandez | |
| 2011/0010865 | A1 | 1/2011 | Flick et al. | |

FOREIGN PATENT DOCUMENTS

| | | | |
|---|---|---|---|
| FR | 2874504 | | 3/2006 |
| JP | 08269208 | A * | 10/1996 |
| JP | 11342049 | | 12/1999 |
| JP | 2000004987 | | 1/2000 |
| JP | 2000210375 | | 8/2000 |
| JP | 2000325410 | | 11/2000 |
| JP | 2002078574 | | 3/2002 |
| JP | 2002238703 | | 8/2002 |
| JP | 2002256132 | | 9/2002 |
| JP | 2003261776 | | 9/2003 |
| JP | 2004167014 | | 6/2004 |
| WO | WO 98/32433 | | 7/1998 |
| WO | WO2006/100558 | | 9/2006 |

* cited by examiner

GELASTIC MATERIAL HAVING VARIABLE OR SAME HARDNESS AND BALANCED, INDEPENDENT BUCKLING IN A MATTRESS SYSTEM

FIELD OF THE INVENTION

The present invention is directed to a particular gelastic material shape to obtain a mattress system having uniform or varying hardness.

BACKGROUND OF THE INVENTION

In U.S. Pat. No. 7,076,822 (issued Jul. 18, 2006) and U.S. Pat. No. 7,138,079 (issued: Nov. 21, 2006), Pearce disclosed the composition of gelastic materials and the methods in which the gelastic materials are formed into desired shapes. The gelastic material is described by Pearce as follows:

Composition of Gelastic Materials

"[T]he compositions of the example gel materials are low durometer thermoplastic elastomeric compounds and viscoelastomeric compounds which include a principle polymer component, an elastomeric block copolymer component and a plasticizer component.

The elastomer component of the example gel material includes a triblock polymer of the general configuration A-B-A, wherein the A represents a crystalline polymer such as a mono alkenylarene polymer, including but not limited to polystyrene and functionalized polystyrene, and the B is an elastomeric polymer such as polyethylene, polybutylene, poly(ethylene/butylene), hydrogenated poly(isoprene), hydrogenated poly(butadiene), hydrogenated poly(isoprene+butadiene), poly(ethylene/propylene) or hydrogenated poly(ethylene/butylene+ethylene/propylene), or others. The A components of the material link to each other to provide strength, while the B components provide elasticity. Polymers of greater molecular weight are achieved by combining many of the A components in the A portions of each A-B-A structure and combining many of the B components in the B portion of the A-B-A structure, along with the networking of the A-B-A molecules into large polymer networks.

[An] example elastomer for making the example gel material is a very high to ultra high molecular weight elastomer and oil compound having an extremely high Brookfield Viscosity (hereinafter referred to as "solution viscosity"). Solution viscosity is generally indicative of molecular weight. "Solution viscosity" is defined as the viscosity of a solid when dissolved in toluene at 25-30° C., measured in centipoises (cps). "Very high molecular weight" is defined herein in reference to elastomers having a solution viscosity, 20 weight percent solids in 80 weight percent toluene, the weight percentages being based upon the total weight of the solution, from greater than about 20,000 cps to about 50,000 cps. An "ultra high molecular weight elastomer" is defined herein as an elastomer having a solution viscosity, 20 weight percent solids in 80 weight percent toluene, of greater than about 50,000 cps. Ultra high molecular weight elastomers have a solution viscosity, 10 weight percent solids in 90 weight percent toluene, the weight percentages being based upon the total weight of the solution, of about 800 to about 30,000 cps and greater. The solution viscosities, in 80 weight percent toluene, of the A-B-A block copolymers useful in the elastomer component of the example gel cushioning material are substantially greater than 30,000 cps. The solution viscosities, in 90 weight percent toluene, of the example A-B-A elastomers useful in the elastomer component of the example gel are in the range of about 2,000 cps to about 20,000 cps.

Thus, the example elastomer component of the example gel material has a very high to ultra high molecular weight.

[A]fter surpassing a certain optimum molecular weight range, some elastomers exhibit lower tensile strength than similar materials with optimum molecular weight copolymers. Thus, merely increasing the molecular weight of the elastomer will not always result in increased tensile strength.

The elastomeric B portion of the example A-B-A polymers has an exceptional affinity for most plasticizing agents, including but not limited to several types of oils, resins, and others. When the network of A-B-A molecules is denatured, plasticizers which have an affinity for the B block can readily associate: with the B blocks. Upon renaturation of the network of A-B-A molecules, the plasticizer remains highly associated with the B portions, reducing or even eliminating plasticizer bleed from the material when compared with similar materials in the prior art, even at very high oil:elastomer ratios. The reason for this performance may be any of the plasticization theories explained above (i.e., lubricity theory, gel theory, mechanistic theory, and free volume theory).

The elastomer used in the example gel cushioning medium is preferably an ultra high molecular weight polystyrene-hydrogenated poly(isoprene+butadiene)-polystyrene, such as those sold under the brand names SEPTON 4045, SEPTON 4055 and SEPTON 4077 by Kuraray, an ultra high molecular weight polystyrene-hydrogenated polyisoprene-polystyrene such as the elastomers made by Kuraray and sold as SEPTON 2005 and SEPTON 2006, or an ultra high molecular weight polystyrene-hydrogenated polybutadiene-polystyrene, such as that sold as SEPTON 8006 by Kuraray. High to very high molecular weight polystyrene-hydrogenated poly(isoprene+butadiene)-polystyrene elastomers, such as that sold under the trade name SEPTON 4033 by Kuraray, are also useful in some formulations of the example gel material because they are easier to process than the example ultra high molecular weight elastomers due to their effect on the melt viscosity of the material.

Following hydrogenation of the midblocks of each of SEPTON 4033, SEPTON 4045, SEPTON 4055, and SEPTON 4077, less than about five percent of the double bonds remain. Thus, substantially all of the double bonds are removed from the midblock by hydrogenation.

[Pearce's preferred] elastomer for use in the example gel is SEPTON 4055 or another material that has similar chemical and physical characteristics. SEPTON 4055 has the optimum molecular weight (approximately 300,000, as determined by [Pearce's] gel permeation chromatography testing). SEPTON 4077 has a somewhat higher molecular weight, and SEPTON 4045 has a somewhat lower molecular weight than SEPTON 4055. Materials which include either SEPTON 4045 or SEPTON 4077 as the primary block copolymer typically have lower tensile strength than similar materials made with SEPTON 4055.

Kuraray Co. Ltd. of Tokyo, Japan has stated that the solution viscosity of SEPTON 4055, the most example A-B-A triblock copolymer for use in the example gel material, 10% solids in 90% toluene at 25° C., is about 5,800 cps. Kuraray also said that the solution viscosity of SEPTON 4055, 5% solids in 95% toluene at 25° C., is about 90 cps. Although Kuraray has not provided a solution viscosity, 20% solids in 80% toluene at 25° C., an extrapolation of the two data points given shows that such a solution viscosity would be about 400,000 cps. . . .

Other materials with chemical and physical characteristics similar to those of SEPTON 4055 include other A-B-A triblock copolymers which have a hydrogenated midblock polymer that is made up of at least about 30% isoprene monomers and at least about 30% butadiene monomers, the percentages being based on the total number of monomers that make up the midblock polymer. Similarly, other A-B-A triblock copolymers which have a hydrogenated midblock polymer that is made up of at least about 30% ethylene/propylene monomers and at least about 30% ethyleneibutylene monomers, the percentages being based on the total number of monomers that make up the midblock polymer, are materials with chemical and physical characteristics similar to those of SEPTON 4055.

Mixtures of block copolymer elastomers are also useful as the elastomer component of some of the formulations of the example gel cushioning medium. In such mixtures, each type of block copolymer contributes different properties to the material. For example, high strength triblock copolymer elastomers are desired to improve the tensile strength and durability of a material. However, some high strength triblock copolymers are very difficult to process with some plasticizers. Thus, in such a case, block copolymer elastomers which improve the processability of the materials are desirable.

In particular, the process of compounding SEPTON 4055 with plasticizers may be improved via a lower melt viscosity by using a small amount of more flowable elastomer such as SEPTON 8006, SEPTON 2005, SEPTON 2006, or SEPTON 4033, to name only a few, without significantly changing the physical characteristics of the material.

In a second example of the usefulness of block copolymer elastomer mixtures in the example gel materials, many block copolymers are not good compatibilizers. Other block copolymers readily form compatible mixtures, but have other undesirable properties. Thus, the uses of small amount of elastomers which improve the uniformity with which a material mixes are desired. KRATONO G 1701, manufactured by Shell Chemical Company of Houston, Tex., is one such elastomer that improves the uniformity with which the components of the example gel material mix.

Many other elastomers, including but not limited to triblock copolymers and diblock copolymers are also useful in the example gel material, [Pearce] believes that elastomers having a significantly higher molecular weight than the ultra-high molecular weight elastomers useful in the example gel material increase the softness thereof, but decrease the strength of the gel. Thus, high to ultra high molecular weight elastomers, as defined above, are desired for use in the example gel material due to the strength of such elastomers when combined with a plasticizer."

Pearce also discloses that numerous additives can be added to obtain the desired hardness. Those additives include and are not limited to conventional bleed-reducing additives, oils, detackifiers, antioxidants, flame retardants, colorants, paints, microspheres, plasticizer components, plasticizer mixtures and mixtures thereof.

Alternative gelastic compositions are disclosed in U.S. Pat. No. 7,159,259 to Chen. The teachings of U.S. Pat. No. 7,159,259 to Chen, and the alternative gelastic compositions are hereby incorporated by reference in this application.

By altering the composition of the gelastic material, Pearce and Chen acknowledge the gelastic material's hardness (or stiffness, or resiliency) can be altered to desired levels.

Methods to Form the Gelastic Material into a Usable Product

Pearce also discloses how the gelastic material is formed into the desired shapes. Those methods are disclosed as follows:

"Melt Blending

A[n] example method for manufacturing the example gel material includes mixing the plasticizer, block copolymer elastomer and any additives and/or fillers (e.g., microspheres), heating the mixture to melting while agitating the mixture, and cooling the compound. This process is referred to as "melt blending."

Excessive heat is known to cause the degradation of the elastomeric B portion of A-B-A and A-B block copolymers which are the example elastomer component of the example gel material for use in the cushions. Similarly, maintaining block copolymers at increased temperatures over prolonged periods of time often results in the degradation of the elastomeric B portion of A-B-A and A-B block copolymers. As the B molecules of an A-B-A triblock copolymer break, the triblock is separated into two diblock copolymers having the general configuration A-B. While it is believed by some in the art that the presence of A-B diblock copolymers in oil-containing plasticizer-extended A-B-A triblock copolymers reduces plasticizer bleed-out, high amounts of A-B copolymers significantly reduce the strength of the example gel material. Thus, Applicant believes that it is important to minimize the compounding temperatures and the amount of time to which the material is exposed to heat.

The plasticizers, any additives and/or fillers, and the A-B-A copolymers are premixed. Preferably, if possible, hydrophobic additives are dissolved into the plasticizer prior to adding the plasticizer component to the elastomer component. If possible, hydrophilic additives and particulate additives are preferably emulsified or mixed into the plasticizer of a[n] example gel material prior to adding the elastomer components. The mixture is then quickly heated to melting. Preferably, the temperature of the mixture does not exceed the volatilization temperature of any component. For some of the example gel materials, [Pearce] prefers temperatures in the range of about 270° F. to about 290° F. For other gel materials, [Pearce] prefers temperatures in the range of about 360° F. to about 400° F. A melting time of about ten minutes or less is example. A melting time of about five minutes or less is [an] example. Even more examples are melting times of about ninety seconds or less. Stirring, agitation, or, most preferably, high shearing forces are example to create a homogeneous mixture. The mixture is then cast, extruded, injection molded, etc.

Next, the mixture is cooled. When injection molding equipment and cast molds are used, the mixture may be cooled by running coolant through the mold, by the thermal mass of the mold itself, by room temperature, by a combination of the above methods, or other methods. Extruded mixtures are cooled by air or by passing the extruded mixture through coolant. Cooling times of about five minutes or less are example. A cooling time of less than one minute is [another] example . . . .

Solvent Blending

A second example method for making the example elastomeric compounds comprises dissolving the elastomeric component in a solvent, adding the plasticizer component and any additives and/or fillers, and removing the solvent from the mixture.

Aromatic hydrocarbon solvents such as toluene may be used for mixing the example gel compounds. Sufficient solvent is added to the elastomer component to dissolve the network of block copolymer molecules. Preferably, the amount of solvent is limited to an amount sufficient for dissolving the network: of block copolymer molecules. The elastomers then dissolve in the solvent. Mixing is example since it speeds up the salvation process. Similarly, slightly elevating the mixture temperature is example since it speeds up the salvation process. Next, plasticizer, any additives and any fillers are mixed into the solvated elastomer. If possible, hydrophobic additives are preferably dissolved in the plasticizer prior to adding the plasticizer to the principle polymer, the block copolymer elastomer and the solvent. Preferably, if possible, hydrophilic additives and particulate additives are emulsified or mixed into the plasticizer prior to adding the elastomer components and solvent. The mixture is then cast into a desired shape (accounting for later shrinkage due to solvent loss) and the solvent is evaporated from the mixture . . . .

Foaming

The example gel material may be foamed. "Foaming", as defined herein, refers to processes which form gas bubbles or gas pockets in the material. A[n] example foamed gel material that is useful in the cushions hereof includes gas bubbles dispersed throughout the material. Both open cell and closed cell foaming are useful in the example gel material. Foaming decreases the specific gravity of the example material. In many cushioning applications, very low specific gravities are example. The specific gravity of the gel material may range, after foaming, from about 0.06 to about 1.30.

An example foamed formulation of the gel material includes at least about 10% gas bubbles or gas pockets, by volume of the material. More preferably, when the material is foamed, gas bubbles or gas pockets make up at least about 20% of the volume of the material. Other foamed formulations of the example gel material contain at least about 40% gas bubbles or gas pockets, by volume, and at least about 70% gas bubbles or pockets, by volume. Various methods for foaming the example gel material include, but are not limited to, whipping or injecting air bubbles into the material while it is in a molten state, adding compressed gas or air to the material while it is in the molten state and under pressure, adding water to the material while it is in the molten state, use of sodium bicarbonate, and use of chemical blowing agents such as those marketed under the brand name SAFOAM® by Reedy International Corporation of Keyport, N.J. and those manufactured by Boehringer Ingelheim of Ingelheim, Germany under the trade name HYDROCEROL®.

When blowing agents such as sodium bicarbonate and chemical blowing agents are used in the example gel material, the material temperature is preferably adjusted just prior to addition of the blowing agent so that the material temperature is just above the blowing temperature of the blowing agent. Following; addition of the blowing agent to the material, the material is allowed to cool so that it will retain the gas bubbles or gas pockets formed by the release of gas from the blowing agent. Preferably, the material is quickly cooled to a temperature below its Tg. The material will retain more gas bubbles and the gas bubbles will be more consistently dispersed throughout the material the quicker the material temperature cools to a temperature below the Tg.

When [an] example gel material is injection molded in accordance with one example compounding; method of the gel material, foaming is example just after the material has been injected into a mold. Thus, as the material passes through the injection molding machine nozzle, its temperature is preferably just higher than the blowing temperature of the blowing agent. Preferably, the material is then cooled to a temperature below its Tg."

The Mold Shape

In each method to form the gelastic material into a usable product, the gelastic material is poured into a mold. In U.S. Pat. No. 6,026,527; Pearce discloses numerous mold structures. The conventional molds form the gelastic material into cushion materials. The cushions are (1) non-lattice, solid structures that are a single cushion element having (a) no columns—apertures and/or indentations—and (b), possibly, relaxation posts extending from the top surface and/or the bottom surface—see U.S. Pat. No. 6,865,759 to Pearce), and/or (2) lattice structures having a first support wall, a second support wall, and a third support wall (possibly more support walls) interconnected to each other to define the perimeter of a buckling (or collapsing) column. Moreover, the support walls define the perimeter of the cushion.

The Lattice Structures

We will concentrate on the lattice structure embodiment because that embodiment is the only gelastic embodiment that has walls that buckle or collapse.

Interconnected means each support wall (a) extends as an indivisible component from one of the other support walls that defines a portion of the collapsible column and (b) merges as an indivisible component into another support wall that also defines a portion of the collapsible column. By indivisible, we mean the first, second and third support walls are a single unit that can be separated by, for example, tearing or cutting the support walls from each other, not just merely pushing them away from each other.

The prior art collapsible columns can also have (a) a bottom wall, (b) a top wall, (c) bottom and top walls, and (d) no bottom or top walls. Not once in the lattice structure prior art is there any disclosure of a gelastic cushion element having a collapsible column not being defined by at least three support walls, one of which collapses into the column, that are indivisible components of each other.

The prior art support walls that are indivisibly interconnected to each other to form the collapsible column inherently increase the tissue interface pressure applied to a patient. In cushions having intersecting-columnar members, support walls are shared between columns. When an irregularly-shaped object is placed on the buckling column cushion, the walls buckle under areas of peak load, thereby relieving and distributing cushioning pressure. The buckling occurs when maximum support pressure per the cushion design is exceeded in a particular area of the cushion. Buckling is accomplished by the support walls buckling or folding on themselves. Surrounding support walls support the object even though buckling has occurred in an area of peak load. The increased tissue interface pressure is a result of the support walls being supported by other support walls to not buckle until the patient's weight overcomes the support walls' collective supporting force. Increased tissue interface pressure is an undesirable characteristic.

That interpretation of the lattice embodiment in confirmed in U.S. Pat. No. 7,076,822 when Pearce wrote, "the columns of the various [lattice structures] are merely illustrative, and in practice, the columns could be triangular, rectangular, square, pentagonal, hexagonal, heptagonal, octagonal, round, oval, n-sided or any other shape in a cross section taken orthogonal to the longitudinal axis of a column. The periphery of the cushioning element [a.k.a., lattice structures] may also be triangular, rectangular, square, pentagonal, hexagonal, heptagonal, octagonal, round, oval, heart-shaped, kidney-shaped, elliptical, oval, egg-shaped, n-sided or any other shape." When reviewing the '822 patent, it is our understanding Pearce defined and illustrated that a lattice gelastic cushion structure is a single unit having numerous columns defined by numerous support walls and the support walls define the cushion's perimeter. The only exception to our understanding is found in the U.S. Pat. No. 6,026,527.

Laid Brick Embodiment

That exception is that Pearce discloses the lattice gelastic cushion structure is a plurality of units, and each unit has at least one column defined by numerous support walls and the support walls define each unit's perimeter; and the cushion's perimeter is defined by support walls from the numerous units. The units are laid in a conventional brick format to obtain the desired cushion shape.

A laid brick structure uses numerous gelastic lattice structures having a rectangular periphery, wherein each gelastic lattice structure can be of the same or different hardness, and are positioned adjacent to each other like bricks laid for a pathway to form the desired cushion. See FIG. 22 of the '527 patent. The brick embodiment has numerous problems, and one of those problems is as follows:

In the brick embodiment illustrated in the '527 patent, the gelastic lattice structure's support walls are adjacent to each other. When one support wall buckles or collapses, the adjacent support wall has an external side pressure applied to it. That external pressure may result in the adjacent gelastic lattice structure not providing the desired support to the patient because its support walls, which experienced the external side pressure, could buckle or collapse (provide no support to the patient) if the lattice structures have different hardnesses. Such results could raise the tissue interface pressure applied to the patient. Increased tissue interface pressure to the patient is normally deleterious to the patient and should be avoided.

Another problem is cushions having intersecting-columnar members is weight. Joinder of adjacent columns in buckling cushions having intersecting-columnar members adds to the stability of each individual column because they each can derive stability from adjoining columns and support walls. Thus, in order to achieve buckling at a low load level, buckling cushions having intersecting-columnar members must be relatively tall, high or deep. Increasing the size of the cushion in this dimension adds gel material and increases weight (and material expense).

The present invention solves this problem.

SUMMARY OF THE INVENTION

A cushioning element has a first gelastic cushion element made from a flexible, resilient, gel cushioning media having shape memory. For example, a suitable gel cushioning media has shape memory and is substantially solid and non-flowable at temperatures below 130° Fahrenheit. The first gelastic cushion element has a first hub section, and a first spoke and a second spoke. Each spoke has a proximal end that extends from the first hub section. Each distal end and the spoke area between the distal end and the proximal end does not interconnect to the other spoke, and/or a second gelastic cushion element having a second hub section and corresponding spokes. Each distal end is positioned near and/or contacts the second gelastic cushion element. At least one of the first hub section, the first spoke and the second spoke is capable of buckling beneath a protuberance that is located on the object.

DETAILED DESCRIPTION OF THE INVENTION

Figure 1:
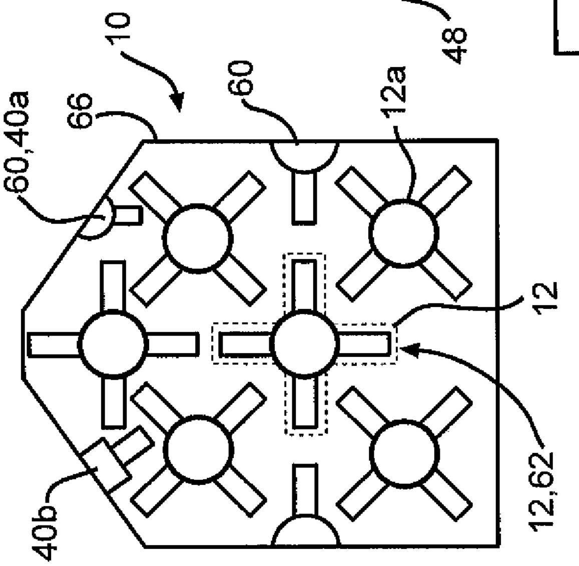
FIG. 1 is a top view of a gelastic cushioning elements in a cushion system, without a cover.

The present invention is directed to a cushion system 10 containing a plurality of gelastic cushion elements 12 (which includes element 12*a* but element 12*a* is being identified to illustrate each gelastic cushion element is an independent element as described below) as shown in FIG. 1. Each gelastic cushion element 12 can have the same hardness or different hardness based on the prior art methods to manufacture the gelastic cushion materials. A major difference between the prior art gelastic cushion elements and the present gelastic cushion elements is the shape.

The shape of the gelastic cushion element is believed to significantly decreases the chance of decubitus ulcers forming on patients by decreasing the tissue interface pressure applied from the gelastic cushion material and the patient.

The applicant has this opinion because the new gelastic cushion element shape has less support walls. Less support walls in a gelastic cushion is contrary to the explicit and implicit teachings of any one involved in gelastic cushion devices, which is described above.

The present invention is designed to decrease tissue interface pressure between the gelastic cushion material and the patient. Another advantage of the present invention over the prior art, is the ability to provide different pressures to different locations on the patient while decreasing the tissue interface pressure to the patient. As such, it is applicant's opinion that altering the shape of the gelastic cushion element creates a significant difference that makes this invention patentable.

Non-Support Walls Columns

Figure 2:
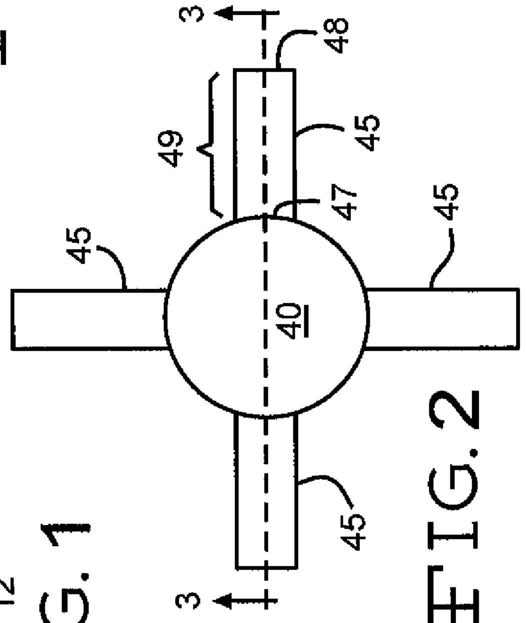
FIG. 2 is an enlarged view of FIG. 1 taken along the box 2.
Figure 3:
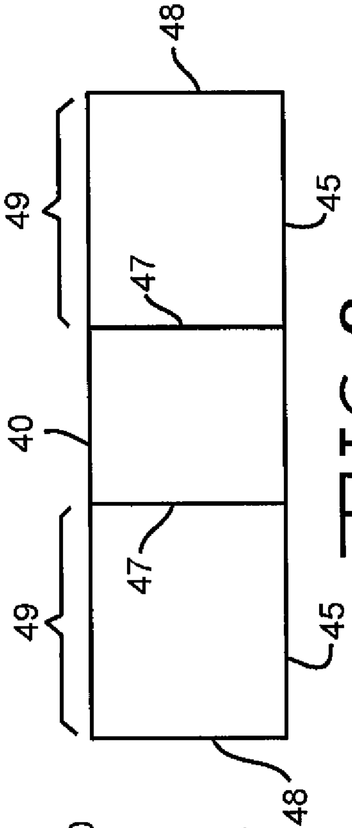
FIG. 3 is a cross-sectional view of FIG. 2 taken along the lines 3-3.
Figure 4:
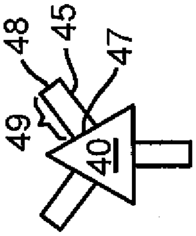
FIG. 4 is an alternative embodiment of FIG. 2.

The gelastic cushion element 12(*a*) is positioned on a support surface and (b) has a hub section 40 and a plurality of spoke sections 45 extending from the hub 40 as shown in FIGS. 2 and 3. Each gelastic cushion element 12 can have a desired hardness. The hardness is controlled by the composition or the gelastic material, which is sufficiently disclosed in the prior art.

The hub section 40, as illustrated in FIGS. 1, 2, 3, 4, is a gelastic material that has a cross-section that may be triangular (see FIG. 4), rectangular (FIG. 1 item 40*b*), square, pentagonal, hexagonal (FIG. 1—element 40*a*), heptagonal, octagonal, round (FIGS. 1, 2, 3), oval (FIG. 5—element 40), heart-shaped, kidney-shaped, elliptical, egg-shaped, n-sided or any other shape.

The spokes 45 are walls of gelastic material that have a cross-section that can be triangular, rectangular, square, pentagonal, hexagonal, heptagonal, octagonal, round, heart-shaped, kidney-shaped, elliptical, oval, egg-shaped, n-sided or any other shape. Each spoke 45 has a proximal end 47 and a distal end 48. Each proximal end 47 extends from the hub 40. Each distal end 48 and the spoke area between the distal end and the proximal end 49 is not interconnected to anything, in particular the other spoke, and/or a second gelastic cushion element 12*a* (a second hub section and its spokes—as generically illustrated in FIG. 1). Instead each distal end 48 is positioned near and/or contacts the second gelastic cushion element 12*a*.

By not having the spokes' distal end 48 interconnected to the other spoke, and/or a second gelastic cushion element 12*a*, the spokes 45 are only supported by the hub section 40. The hub section 40 does provide a first lateral support force to each spoke 45. The spokes 45 will not be altered by a second lateral support force from a support wall positioned on the spokes' distal end 48. That means the spokes will buckle at a predetermined pressure as a result of the gelastic material's thickness and hardness and not be influenced by second (or even third) lateral forces from other support walls interconnected in the cushion system 10.

Each gelastic cushion element 12 (and 12*a*) is independent from other gelastic cushion elements in the cushion system 10. Moreover each gelastic cushion element 12 can have the same or different thicknesses and/or hardness as other gelastic cushion elements in the cushion system 10. That means the cushion system 10 can provide the desired tissue interface pressure to specific sections in the cushion system 10 by positioning certain gelastic cushion elements 12 in the cushion system 10.

The gelastic cushion elements 12 are divided into peripheral elements 60 and interior elements 62 (as illustrated in FIG. 1). The peripheral elements 60 are those gelastic cushion elements 12 positioned along the cushion system's 10 perimeter 66. The peripheral gelastic cushion elements 12, 60 do not have any portion, hub or spoke(s), extend beyond the cushion system's perimeter 66.

As for the interior elements 62, each hub 40 has a minimum of three spokes 45 extending from each hub 12. The interior elements 62 can have more spokes 45, like 4 or 5 spokes extending from the hub section 40.

Buckling

The terms buckle or buckling, in this application, mean the hub section 40 and/or the spokes 45 have a height and cross-section that cause the structures to (a) bend when weight is positioned thereon and (b) straightens when no weight is applied. Bend can include some crumpling but not collapsing. If the hub section 40 and/or the spokes 45 collapses the patient essentially contacts the support surface with the width of the hub section 40 and/or the spokes 45 separating the patient from the support surface. In other words, the patient bottoms out when the hub section 40 and/or the spokes 45 collapses. Bottoming out is deleterious to the patient because it increases the patient's tissue interface pressure. Increased tissue interface pressure increases the chances of the formation of bed sores, which is undesirable. Accordingly, the hub section 40 and/or the spokes 45 buckle, not collapse.

ALTERNATIVE EMBODIMENT

Figure 5:
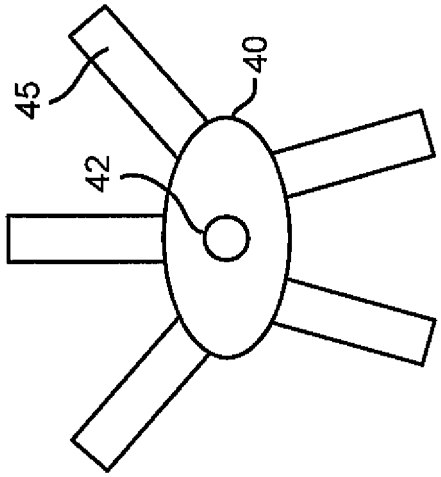
FIG. 5 is an alternative embodiment of FIG. 2.

The hub section 40 can also define an opening 42 as illustrated in FIG. 5. The opening 42 could be triangular, rectangular, square, pentagonal, hexagonal, heptagonal, octagonal, round, oval, n-sided or any other shape in a cross section taken orthogonal to the longitudinal axis of the opening.

In the opening hub embodiment, the hub's 40 walls that define the opening buckle, not collapse, when a patient's weight is positioned thereon.

Uses:

The present invention is adapted for use in beds, mattressing, operating table pads, stretcher cushions, sofas, chairs, wheelchair seat cushions, vehicle seats, bicycle seats, forklift seats, truck seats, car seats, lawnmower seats, motorcycle seats, tractor seats, boat seats, plane seats, and/or train seats.

It is intended that the above description of the preferred embodiments of the structure of the present invention and the description of its operation are but one or two enabling best mode embodiments for implementing the invention. Other modifications and variations are likely to be conceived of by those skilled in the art upon a reading of the preferred embodiments and a consideration of the appended claims and drawings. These modifications and variations still fall within the breadth and scope of the disclosure of the present invention.

I claim:

1. A yieldable patient support cushion that includes a flexible, resilient, gel cushioning media having shape memory and being substantially solid and non-flowable at temperatures below 130 degrees Fahrenheit, the cushion for supporting a portion of a patient's body when in a seated or lying position thereon and comprising:

a quantity of gel cushioning medium forming a base and an outer periphery of said cushion, said cushioning medium being compressible so that it will deform under the compressive force of a portion of a patient's body positioned on top of the cushioning medium, said gel cushioning medium forming a plurality of interior gelastic elements projecting from said base, interior of said outer periphery, and a plurality of peripheral gelastic elements projecting from said base adjacent or at said outer periphery;

each of said interior gelastic elements comprising:

a first hub section extending from said base and having a hub cross-section generally parallel to said base, and a first spoke, a second spoke, and a third spoke, each respective spoke of said spokes extending from said base and having a spoke cross-section generally parallel to said base and being different than said hub cross-section, and each spoke having a proximal end extending from said first hub section, a distal end, and a spoke area between said distal end and said proximal end;

each of said peripheral gelastic elements comprising:

a second hub section, and at least one spoke having a distal end, a proximal end extending from said second hub section, and a spoke area between said distal end and said proximal end of said at least one spoke; and wherein each of said distal ends of each respective spoke of a respective gelastic element and each of said spoke areas of the respective spoke of the respective gelastic element are disconnected from the other gelastic elements and from the other spokes of the respective gelastic element; and wherein at least one of the first hub section, the first spoke, and the second spoke is configured to buckle when the at least one of the first hub section, the first spoke, and the second spoke is subject to a predetermined pressure by the patient's body when the patient's body overlays the at least one of the first hub, the first spoke, the second spoke, and the third spoke.

2. The cushion of claim 1, wherein the hub cross-section of the first hub section has a shape selected from a group of shapes consisting of triangular, rectangular, square, pentagonal, hexagonal, heptagonal, octagonal, round, heart-shaped, kidney-shaped, elliptical, oval, egg-shaped, and n-sided.

3. The cushion of claim 1, wherein the hub cross-section of the first hub section has an opening.

4. The cushion of claim 3, wherein the opening has a shape selected from a group of shapes consisting of triangular, rectangular, square, pentagonal, hexagonal, heptagonal, octagonal, round, oval, heart-shaped, kidney-shaped, elliptical, egg-shaped, and n-sided.

5. The cushion of claim 1, wherein the interior gelastic elements and each of the peripheral gelastic elements have the same hardness.

6. The cushion of claim 1, wherein the interior gelastic elements and the peripheral gelastic elements have different hardnesses.

7. The cushion of claim 1, wherein the interior gelastic elements are positioned over a support surface.

8. The cushion of claim 1, wherein each of the interior gelastic elements is adapted for use in beds, mattresses, operating table pads, stretcher cushions, sofas, chairs, wheelchair seat cushions, vehicle seats, bicycle seats, forklift seats, truck seats, car seats, lawnmower seats, motorcycle seats, tractor seats, boat seats, plane seats, or train seats.

9. The cushion of claim 1, wherein the spoke cross-section of each of said spokes of said interior gelastic elements has a shape selected from a group of shapes consisting of triangular, rectangular, square, pentagonal, hexagonal, heptagonal, octagonal, round, heart-shaped, kidney-shaped, elliptical, oval, egg-shaped, and n-sided.

10. The cushion of claim 1 wherein said interior and peripheral gelastic elements have generally the same height.

11. The cushion of claim 1, wherein each interior gelastic element includes a space between each of its spokes, wherein at least one spoke of one of said interior gelastic elements extends into said space of another adjacent gelastic element.

12. The cushion of claim 11, at least one spoke of a plurality of said interior gelastic elements each extend into a respective space of an adjacent interior gelastic element.

13. The cushion of claim 1, wherein the hub cross-section of the first hub section comprises a circular shape, and each of the spokes of the first hub section are radially spaced around said hub section.

14. The cushion of claim 1, wherein the first hub section includes two co-linear axes extending radially outward from said hub section, said first spoke being aligned along one of said axes, and said second spoke being aligned along the other of said axes.

15. The cushion of claim 1, wherein said first spokes and said second spokes have approximately equal lengths.

16. The cushion of claim 1, wherein said at least one spoke of said second hub section extends inwardly from said outer periphery.

17. The cushion of claim 1, wherein each of the spokes of the gelastic elements buckle when subject to a predetermined pressure by the patient's body when patient's body overlays the spokes.

* * * * *